(12) United States Patent
Kageyama et al.

(10) Patent No.: US 7,856,703 B2
(45) Date of Patent: Dec. 28, 2010

(54) METHOD FOR MAKING A SHORT-CIRCUITING MEMBER AND METHOD FOR MAKING A COMMUTATOR

(75) Inventors: Ryohei Kageyama, Hamamatsu (JP); Nobuo Kasao, Kosai (JP); Toshiyuki Osawa, Hamamatsu (JP); Yuichi Terada, Hamamatsu (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 717 days.

(21) Appl. No.: 11/489,739

(22) Filed: Jul. 19, 2006

(65) Prior Publication Data

US 2007/0028443 A1 Feb. 8, 2007

(30) Foreign Application Priority Data

Jul. 19, 2005 (JP) ............................. 2005-209125
Jul. 19, 2005 (JP) ............................. 2005-209130

(51) Int. Cl.
*H01R 43/06* (2006.01)

(52) U.S. Cl. ........................... 29/597; 29/598; 310/233; 310/234

(58) Field of Classification Search ................... 29/596, 29/597, 598; 310/233–237
See application file for complete search history.

(56) References Cited

U.S. PATENT DOCUMENTS

2007/0069603 A1* 3/2007 Terada et al. ................. 310/234

FOREIGN PATENT DOCUMENTS

JP 2000-134873 5/2000
WO WO 2005034315 A1 * 4/2005

* cited by examiner

*Primary Examiner*—A. Dexter Tugbang
*Assistant Examiner*—Livius R Cazan
(74) *Attorney, Agent, or Firm*—Fulwider Patton LLP

(57) ABSTRACT

A short-circuit member includes a short-circuit conductor and a short-circuit insulator. The short-circuit conductor includes superimposed first and second short-circuit member formation groups. Each of the short-circuit member formation groups has outer terminals, inner terminals, and linking portions. The outer terminals contact one another and the inner terminals contact one another between each of the short-circuit member formation groups. The linking portions are maintained in non-contact between each of the short-circuit member formation groups. In a method for manufacturing the short-circuit member, the short-circuit insulator is molded by filling molten resin material between opposing ones of the linking portions in the first and second short-circuit member formation groups, which are superimposed in a mold, along a longitudinal direction of the linking portions so that filled resin material leaks out of gaps between adjacent ones of the linking portions in a thicknesswise direction of the linking portions.

4 Claims, 6 Drawing Sheets

METHOD FOR MAKING A SHORT-CIRCUITING MEMBER AND METHOD FOR MAKING A COMMUTATOR

BACKGROUND OF THE INVENTION

The present invention relates to a method for manufacturing a short-circuit member for short-circuiting predetermined commutator pieces, a method for manufacturing a commutator, and an apparatus for manufacturing a short-circuit member.

In the prior art, an armature for a motor having power feeding brushes may include a commutator in which a plurality of commutator pieces are short-circuited. Such a motor allows electric current to flow even to commutator pieces that are not in contact with power feeding brushes by short-circuiting predetermined commutator pieces. This enables a reduction in the number of power feeding brushes required in the motor.

In one example, in a rotation machine described in Japanese Laid-Open Patent Publication No. 2000-134873, short-circuit wires for short-circuiting commutator pieces are arranged on an end portion of a commutator.

However, when the short-circuit wires are arranged on the end portion of the commutator, the short-circuit wires may rub against one another or the short-circuit wires may rub against coils and cause an electric connection (layer short-circuiting). This would lower yield during the manufacturing of the armature or cause erroneous operation.

Therefore, for example, short-circuit conductors may be formed by punching a conductive plate, and the short-circuit conductors may be embedded in resin material to form a short-circuit member. However, even in such a case, when filling a mold, which accommodates the short-circuit conductors, with molten resin material, the pressure produced deforms the short-circuit conductor. This may cause layer short-circuiting.

SUMMARY OF THE INVENTION

The present invention has been made to solve the above problem, and it is an object of the present invention to provide a method for manufacturing a short-circuit member for short-circuiting predetermined commutator pieces, a method for manufacturing a commutator, and an apparatus for manufacturing a short-circuit member, which easily prevents layer short-circuiting.

To achieve the above object, one aspect of the present invention provides a method for manufacturing a short-circuit member including a short-circuit conductor, which short-circuits a plurality of commutator pieces arranged around a rotation axis of a motor, and a short-circuit insulator for the short-circuit conductor. The short-circuit conductor includes first and second short-circuit member formation groups arranged in a superimposed state. Each of the short-circuit member formation groups has a plurality of outer terminals arranged about the rotation axis in the vicinity of the commutator pieces, a plurality of inner terminals arranged about the rotation axis inward from the outer terminals, and a plurality of linking portions linking the outer terminals to the inner terminals. The outer terminals contact one another and the inner terminals contact one another between each of the short-circuit member formation groups. The linking portions are maintained in non-contact between each of the short-circuit member formation groups. The linking portions in at least one of the first and second short-circuit member formation groups link the outer terminals and the inner terminals that are separated from each other by a predetermined angle in the circumferential direction. The short-circuit conductor is embedded in the short-circuit insulator. The method includes an insulator filling step for molding the short-circuit insulator by filling molten resin material between opposing ones of the linking portions in the first and second short-circuit member formation groups, which are superimposed in a mold, along a longitudinal direction of the linking portions so that filled resin material leaks out of gaps between adjacent ones of the linking portions in a thicknesswise direction of the linking portions.

A second aspect of the present invention provides a method for manufacturing a commutator including the short-circuit member manufactured through the first aspect. The method includes fixing the short-circuit member to a commutator main body including a main body insulator for holding the commutator pieces or to an intermediate member obtained in the process of manufacturing the commutator main body.

A third aspect of the present invention provides an apparatus for manufacturing a short-circuit member including a short-circuit conductor, which short-circuits a plurality of commutator pieces arranged around a rotation axis of a motor, and a short-circuit insulator for the short-circuit conductor. The short-circuit conductor includes first and second short-circuit member formation groups arranged in a superimposed state. Each of the short-circuit member formation groups has a plurality of outer terminals arranged about the rotation axis in the vicinity of the commutator pieces, a plurality of inner terminals arranged about the rotation axis inward from the outer terminals, and a plurality of linking portions linking the outer terminals to the inner terminals. The outer terminals contact one another and the inner terminals contact one another between each of the short-circuit member formation groups. The linking portions are maintained in non-contact between each of the short-circuit member formation groups. The linking portions in at least one of the first and second short-circuit member formation groups link the outer terminals and the inner terminals that are separated from each other by a predetermined angle in the circumferential direction. The short-circuit conductor is embedded in the short-circuit insulator. The apparatus includes a gate for filling molten resin material between opposing ones of the linking portions in the first and second short-circuit member formation groups, which are superimposed in a mold, along a longitudinal direction of the linking portions. Filled resin material leaks out of gaps between adjacent ones of the linking portions in a thicknesswise direction of the linking portions to mold the short-circuit insulator.

DETAILED DESCRIPTION OF THE PRESENT EMBODIMENTS

Figure 1:
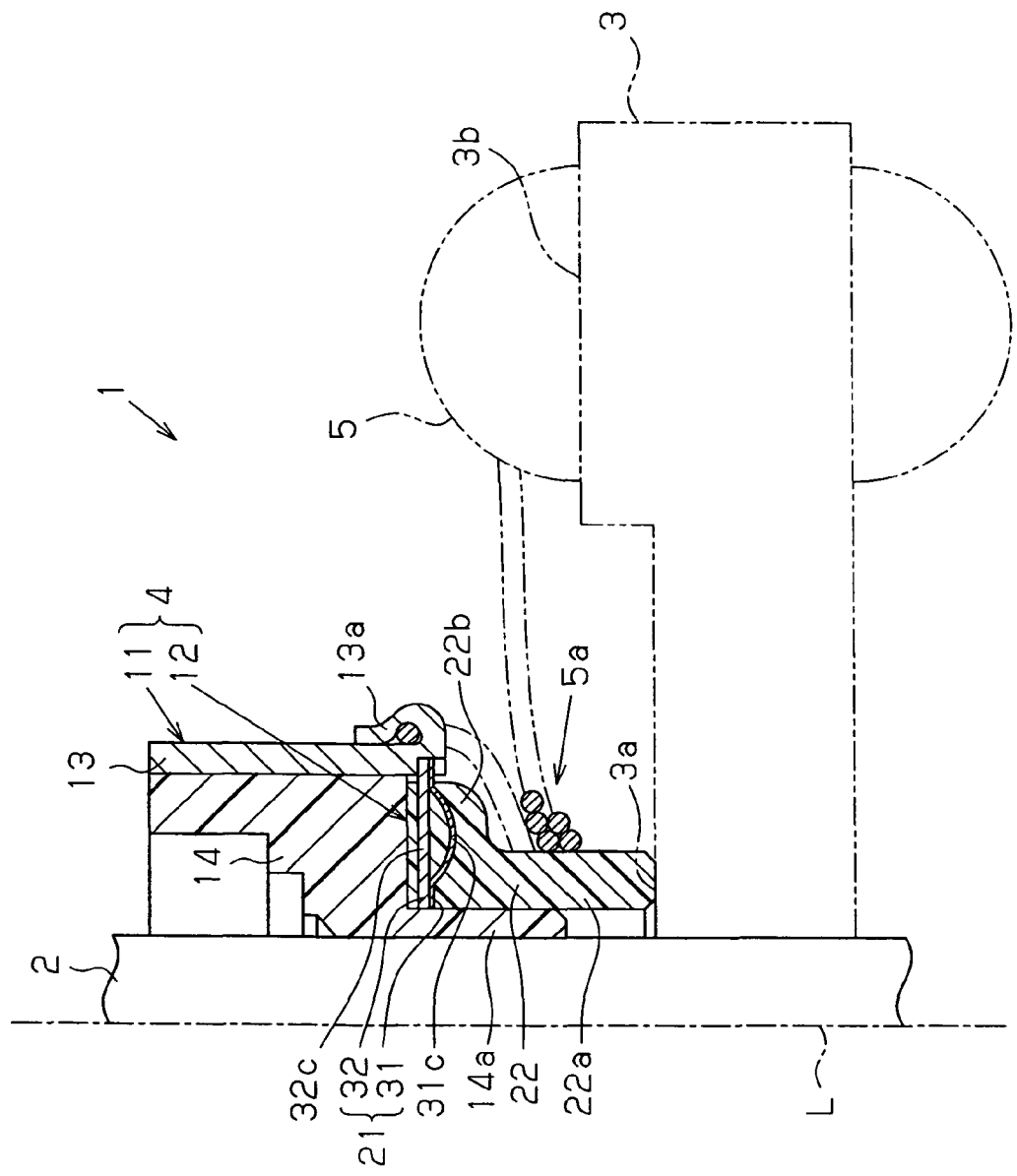
FIG. 1 is a schematic structural diagram of an armature according to one embodiment.

A present embodiment of the present invention will now be described with reference to FIGS. 1 to 7. A motor includes a stator (not shown) and an armature 1, which is shown in FIG. 1. The stator has a plurality of permanent magnets that are arranged in the circumferential direction around a rotation axis L of the motor. FIG. 1 only shows one side of the armature 1 with respect to its axis, or with respect to the rotation axis L of the motor.

The armature 1 includes a metal rotation shaft 2, an armature core 3 fixed to the rotation shaft 2, a commutator 4 fixed to the rotation shaft 2, and coils 5. The rotation shaft 2 is rotatably supported by the stator. The armature core 3 is surrounded by the permanent magnets of the stator.

The armature core 3 has a tubular portion 3a, through which the rotation shaft 2 is inserted, and a plurality of teeth 3b (only one is shown in FIG. 1), which extend radially outward from the tubular portion 3a. The coils 5 are wound around the teeth 3b.

The commutator 4 includes a commutator main body 11 and a short-circuit member 12, which is arranged at an axial end portion of the commutator main body 11. The commutator main body 11 includes a plurality of (in the present embodiment, twenty-four in 15-degree intervals) commutator pieces 13 that are arranged in the circumferential direction. The commutator main body 11 further includes a generally cylindrical main body insulator 14, which holds the radially inner side of the commutator pieces 13. The commutator pieces 13 are formed by dividing a cylinder in the circumferential direction along the outer circumference of the main body insulator 14. Anode and cathode power feeding brushes (not shown) are pressed against the commutator pieces 13 in a slidable manner from the radially outer side.

The lower end of each commutator piece 13 projects downward from the main body insulator 14 and is bent radially outward to form a wire connection portion 13a for hooking a coil 5. The main body insulator 14 is made of a thermosetting resin (a phenol resin in the present embodiment). A cylindrical portion 14a, which functions as a wall, extends in the axially downward at the center of the lower portion of the main body insulator 14. The inner diameter of the main body insulator 14 including the cylindrical portion 14a is set to enable the rotation shaft 2 to be pressed-fitted therein.

The short-circuit member 12 includes a short-circuit conductor 21 and a short-circuit insulator 22. The short-circuit conductor 21 short-circuits commutator pieces 13 that are separated from each other by a predetermined angular interval (120 degrees in the present embodiment). The short-circuit insulator 22 holds the short-circuit conductor 21 in a state embedded in the short-circuit insulator 22.

Figure 2:
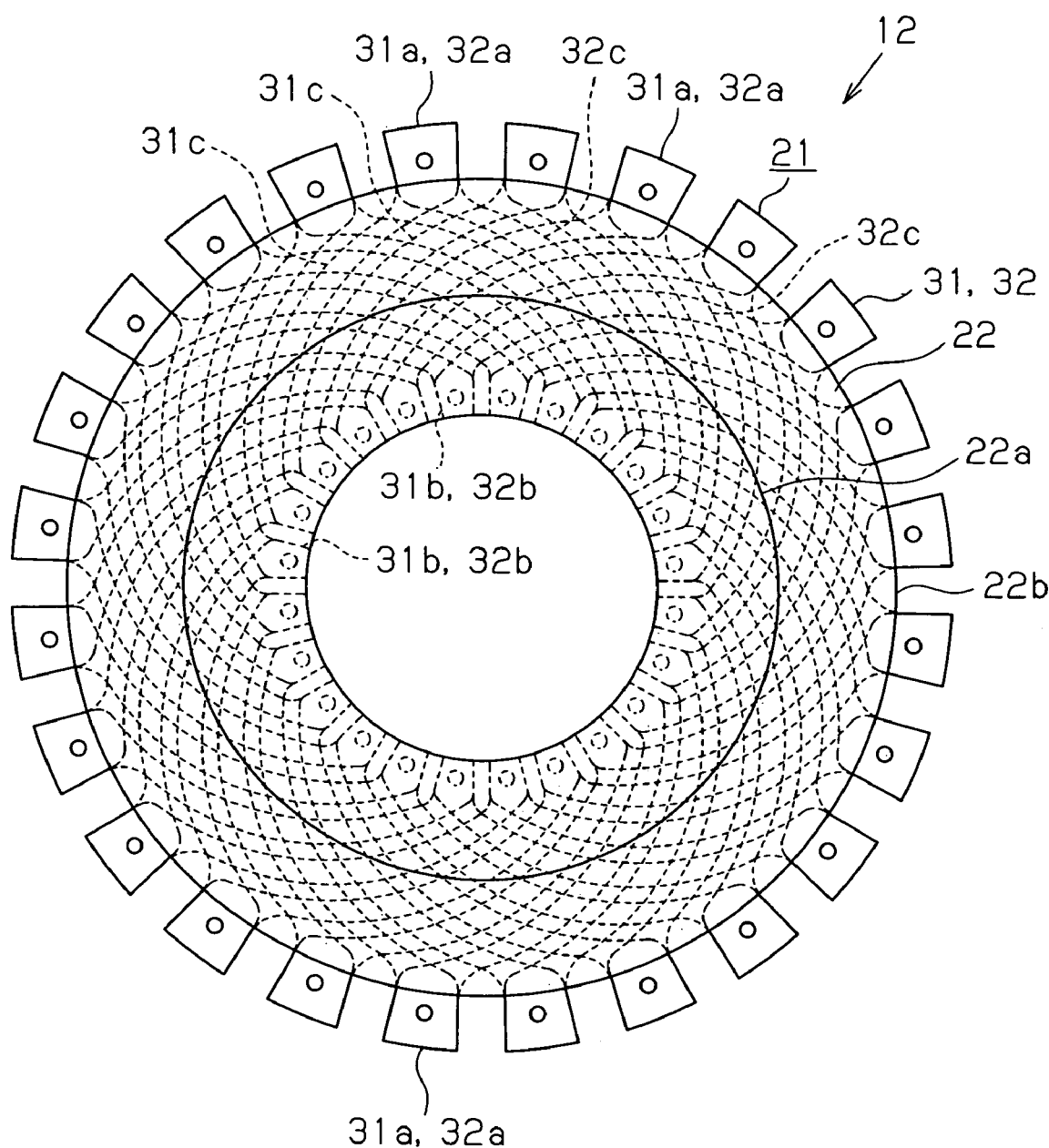
FIG. 2 is a plan view showing a short-circuit member.

The short-circuit conductor 21 includes two superimposed short-circuit member formation groups 31 and 32. In FIG. 1, the first short-circuit member formation group 31 is arranged under the second short-circuit member formation group 32. As shown in FIG. 2, the short-circuit member formation groups 31 and 32 include a plurality of outer terminals 31a and 32a, a plurality of inner terminals 31b and 32b, and a plurality of linking portions 31c and 32c. The outer terminals 31a and 32a are arranged in the circumferential direction of the rotation shaft 2. The inner terminals 31b and 32b are arranged in the circumferential direction of the rotation shaft 2 inward from the outer terminals 31a and 32a. The linking portions 31c and 32c link the outer terminals 31a and 32a and the inner terminals 31b and 32b. The short-circuit member formation groups 31 and 32 are formed as layers respectively arranged along two substantially parallel flat planes. Thus, the short-circuit member formation group 31 never intersects the other short-circuit member formation group 32. In the present embodiment, the short-circuit member formation group 31 includes twenty-four outer terminals 31a, twenty-four inner terminals 31b, and twenty-four linking portions 31c, and the short-circuit member formation group 32 includes twenty-four outer terminals 32a, twenty-four inner terminals 32b, and twenty-four linking portions 32c.

Figure 3:
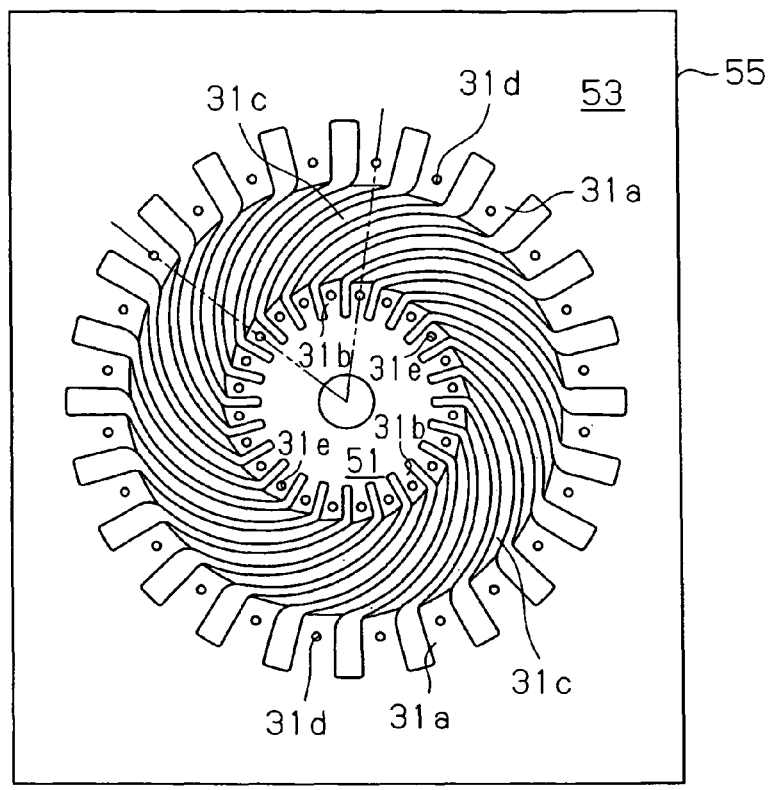
FIG. 3 is a schematic diagram illustrating a method for manufacturing the armature.
Figure 4:
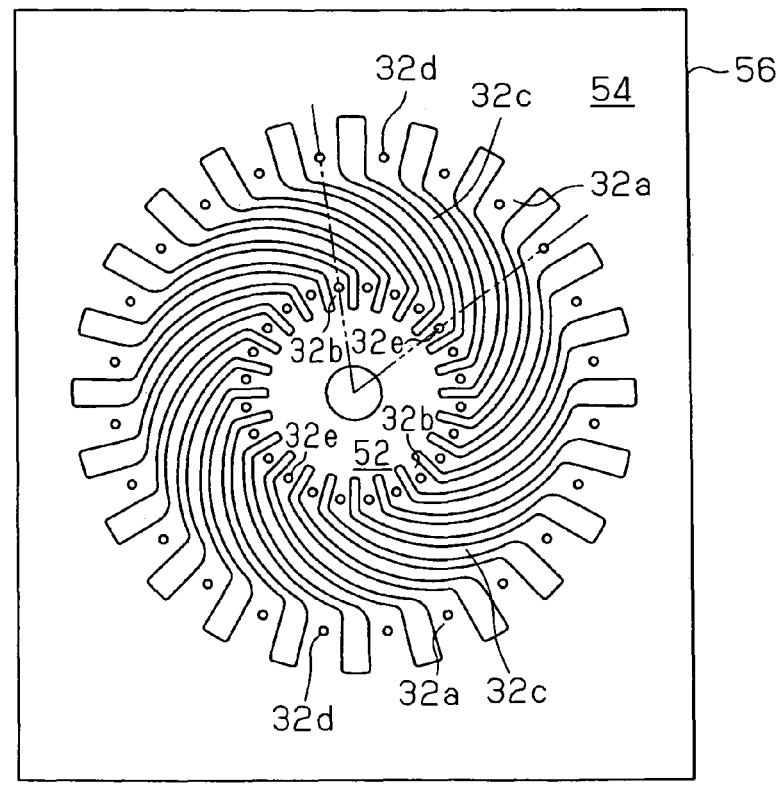
FIG. 4 is a schematic diagram illustrating the method for manufacturing the armature.

The linking portions 31c and 32c in the short-circuit member formation groups 31 and 32 link the corresponding outer terminals 31a and 32a and the corresponding inner terminals 31b and 32b at positions separated from each other by a predetermined angle (60 degrees corresponding to four terminals in the present embodiment). As shown in FIG. 3, each linking portion 31c in the lower first short-circuit member formation group 31 links one of the outer terminals 31a to one of the inner terminals 31b, which is located at a position separated from that outer terminal 31a by the predetermined angle in the counterclockwise direction. As shown in FIG. 4, each linking portion 32c in the upper second short-circuit member formation group 32 links one of the outer terminals 32a to one of the inner terminals 32b, which is located at a position separated from that outer terminal 32a by the predetermined angle in the clockwise direction. Further, the linking portions 31c and 32c in the present embodiment extend along an involute curve.

The lower short-circuit member formation group 31 is thinner than the upper short-circuit member formation group 32 and is formed from a material having a small electric resistivity. In the present embodiment, the lower short-circuit member formation group 31 is formed from a copper material and the upper short-circuit member formation group 32 is formed from a brass material. In the short-circuit member formation groups 31 and 32, the different parts (the outer terminals 31a and 32a, the inner terminals 31b and 32b, and the linking portions 31c and 32c) each have a constant thickness.

The linking portions 31c in the lower short-circuit member formation group 31 are curved to project axially downward with respect to the outer terminals 31a and the inner terminals 31b. To ease visual understanding, FIG. 1 shows cross-sections taken along the linking portions 31c and 32c. Further, the linking portions 32c in the upper short-circuit member formation group 32 lie along the same plane as the outer terminals 32a and the inner terminals 32b. When the short-circuit member formation groups 31 and 32 are superimposed, the outer terminals 31a and 32a come in contact with one another and the inner terminals 31b and 32b come in contact with one another in the superimposing direction. The linking portions 31c and 32c do not come in contact with each other.

The short-circuit member formation groups 31 and 32 are crimped and fixed to each other. In detail, the outer terminals 31a and the inner terminals 31b in the lower short-circuit member formation group 31 have holes 31d and 31e (refer to FIG. 6(a)) that are formed beforehand. The outer terminals 32a and the inner terminals 32b in the upper short-circuit member formation group 32 have projections 32d and 32e (refer to FIG. 6(a)) that are formed beforehand. The short-circuit member formation groups 31 and 32 are arranged so that when they are superimposed, the projections 32d and 32e extend through the holes 31d and 31e (refer to FIG. 6(b)) to be crimped. The crimping deforms the tips of the projections 32d and 32e and covers the openings of the holes 31d and 31e so that the projections 32d and 32e are fixed to the corresponding holes 31d and 31e (refer to FIG. 6(b)). The short-circuit member 12 with this structure electrically connects the twenty-four outer terminals 31a, and 32a arranged at 120-degree intervals and the twenty-four inner terminals 31b and 32b arranged at 120-degree intervals.

In the short-circuit member formation groups 31 and 32 of the present embodiment, the outer terminals 31a and 32a are spot-welded together and the inner terminals 31b and 32b are spot-welded together (not shown). In detail, the surfaces of the short-circuit member formation groups 31 and 32 in the present embodiment are tin-plated in advance. The above welding melts and bonds the tin plating between the outer terminals 31a and 32a or between the inner terminals 31b and 32b. This stabilizes and reduces the contact resistance.

The short-circuit insulator 22 is made of a thermoplastic resin and differs in material from the main body insulator 14, which is made of a thermosetting resin. The short-circuit insulator 22 keeps parts of the short-circuit conductor 21, or the short-circuit member formation groups 31 and 32 (the outer terminals 31a and 32a, the inner terminals 31b and 32b, and the linking portions 31c and 32c), spaced from one another. The short-circuit insulator 22 is also arranged in the superimposing direction of the short-circuit member formation groups 31 and 32, or at both sides of the axial direction, to cover and embed the short-circuit conductor 21 (short-circuit member formation groups 31 and 32) except for the outer terminals 31a and 32a.

A boss 22a, which extends from the axial end portion of the commutator main body 11, is integrally formed with the short-circuit insulator 22. Further, the short-circuit insulator 22 has a large-diameter portion 22b at a basal end portion of the boss 22a. The large-diameter portion 22b projects downward in the axial direction from the axial end portion of the commutator main body 11 and has an outer diameter greater than the outer diameter of the boss 22a. The inner diameter of the tubular short-circuit insulator 22 is equal to the outer diameter of the cylindrical portion 14a of the main body insulator 14. The short-circuit insulator 22 enables the cylindrical portion 14a to be fitted therein. The short-circuit insulator 22 has a circular cross-section (refer to FIG. 1) in a manner that its outer diameter changes smoothly from the large-diameter portion 22b to the boss 22a.

The outer diameter of the short-circuit insulator 22, that is, the outer diameter of the large-diameter portion 22b, which is the outer diameter at the vicinity of the short-circuit conductor 21, is slightly smaller than the cylindrical surface along which the commutator pieces 13 are arranged along the circumferential direction.

The short-circuit member 12 is arranged on the axial end portion of the commutator main body 11 to electrically connect its outer terminals 31a and 32a to the commutator pieces 13. In detail, lower ends of the commutator pieces 13 are formed to have recesses 13b (refer to FIG. 8(a)) corresponding to the outer terminals 31a and 32a. In a state in which the outer terminals 31a and 32a are arranged in the recesses 13b, the two side walls of the recesses 13b are crimped. The crimped walls are deformed to partially cover the outer terminals 31a and 32a. As a result, the short-circuit member 12 is fixed to the commutator main body 11 (refer to FIG. 8(b)).

Figure 8A:
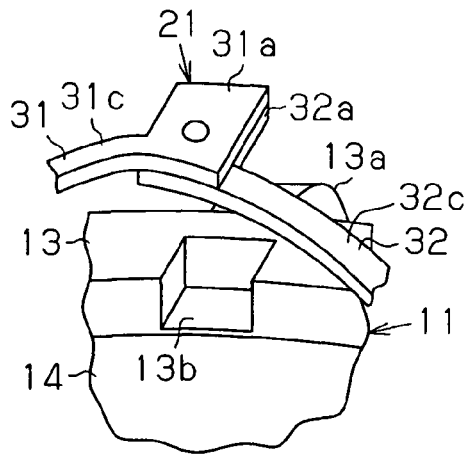
FIGS. 8(a) and 8(b) are schematic diagrams showing a further example of a short-circuit member.
Figure 8B:
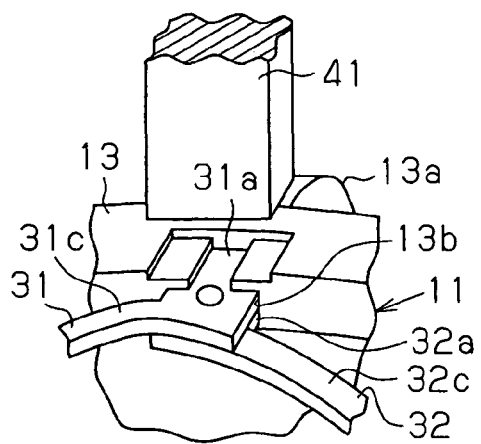

FIGS. 8(a) and 8(b) do not show the short-circuit insulator 22 of the short-circuit member 12 and schematically shows only the short-circuit conductor 21 of the short-circuit member 12. FIG. 8(b) additionally shows a jig or, punch 41, used for crimping. As shown in FIG. 1, the cylindrical portion 14a of the main body insulator 14 is fitted in the short-circuit insulator 22. Further, the vicinity of the short-circuit conductor 21 in the short-circuit insulator 22 is accommodated in a gap located inside the axial end portion of the commutator main body 11.

As shown in FIG. 1, the armature core 3 and the commutator 4 of the above-described structure are aligned in the axial direction with respect to the rotation shaft 2, which is inserted through the tubular portion 3a and the cylindrical portion 14a. Further, the commutator 4 comes in contact with the tubular portion 3a of the armature core 3 at the distal surface of the boss 22a. The boss 22a functions as a guide that supports the coil 5, or the so-called crossover wire 5a, that extends from a wire connection portion 13a of a commutator piece 13 to a predetermined tooth 3b located at a position separated from that wire connection portion 13a in the circumferential direction. More specifically, the boss 22a guides the coil 5 to prevent the coil 5 from coming into direct contact with the rotation shaft 2 or to prevent each coil 5 from being abruptly bent with a sharp curvature.

The method for manufacturing the commutator 4 for the armature 1 with the above-described structure will now be described. First, a method for manufacturing the short-circuit member 12 will be described. The method for manufacturing the short-circuit member 12 includes a punching process, a superimposing process, an insulator filling process, and a removing process.

In the punching process, as shown in FIGS. 3 and 4, conductive plates 55 and 56 are punched out in a manner that the linking portions 31c and 32c in the short-circuit member formation groups 31 and 32 are formed spaced from one another, and inner linking portions 51 and 52 and outer linking portions 53 and 54 for annularly linking the linking portions 31c and 32c respectively at the inner side and the outer side in the radial direction are formed. In this state, the conductive plates 55 and 56 are punched out in a manner that the outer terminals 31a and 32a are formed spaced from one another in the circumferential direction, and the inner terminals 31b and 32b are formed spaced from one another in the circumferential direction. At the same time, the holes 31d and 31e and the projections 32d and 32e are formed. Further, at the same time, the linking portions 31c in the first short-circuit member formation group 31 are curved to project toward one side in the axial direction from the outer terminals 31a and the inner terminals 31b.

The conductive plates 55 and 56 are punched out in a direction opposite to the direction in which the surfaces of the second short-circuit member formation groups 31 and 32 face toward each other. More specifically, the conductive plate 55 corresponding to the first short-circuit member formation group 31 is punched out downward in FIG. 1. The conductive plate 56 corresponding to the second short-circuit member formation group 32 is punched out upward in FIG. 1. Further, the conductive plate 55, which corresponds to the first short-circuit member formation group 31, is thinner than the conductive plate 56, which corresponds to the second short-circuit member formation group 32, and is formed from a material having a smaller electrical resistivity than the conductive plate 56. The conductive plate 55 is formed from a copper material, and the conductive plate 56 is formed from a brass material. Tin plating is applied to the surfaces of the conductive plates 55 and 56.

Figure 5:
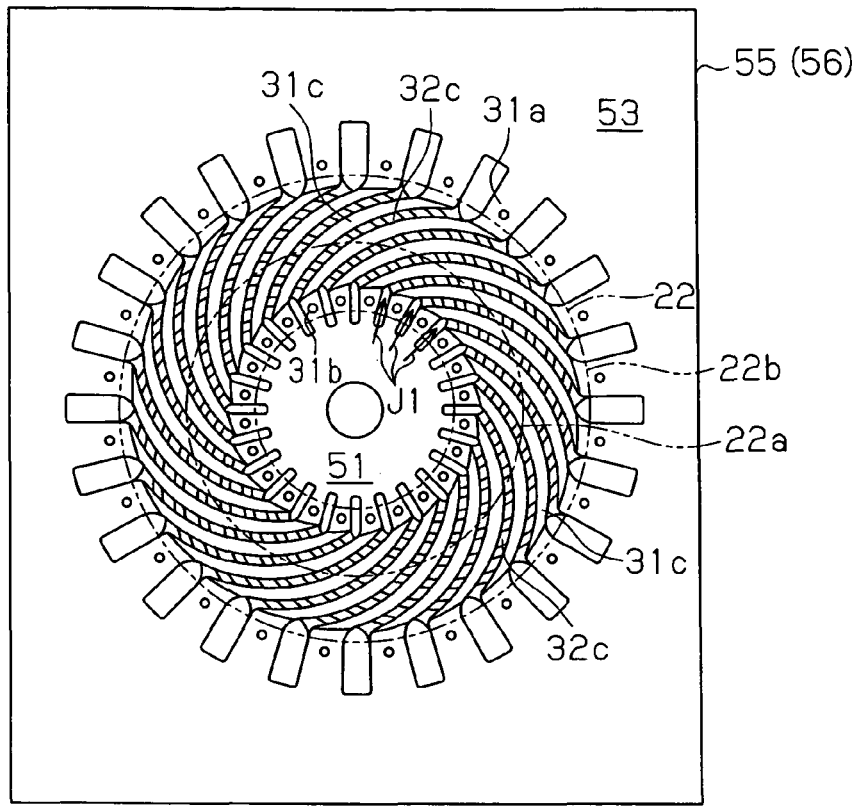
FIG. 5 is a schematic diagram illustrating the method for manufacturing the armature.
Figure 6A:
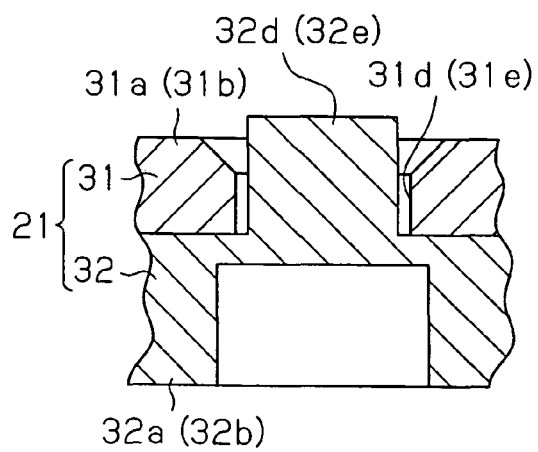
FIGS. 6(a) and 6(b) are schematic diagrams illustrating the method for manufacturing the armature.
Figure 6B:
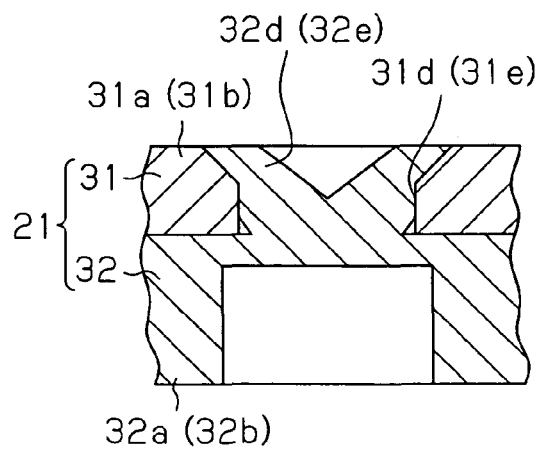
Figure 7:
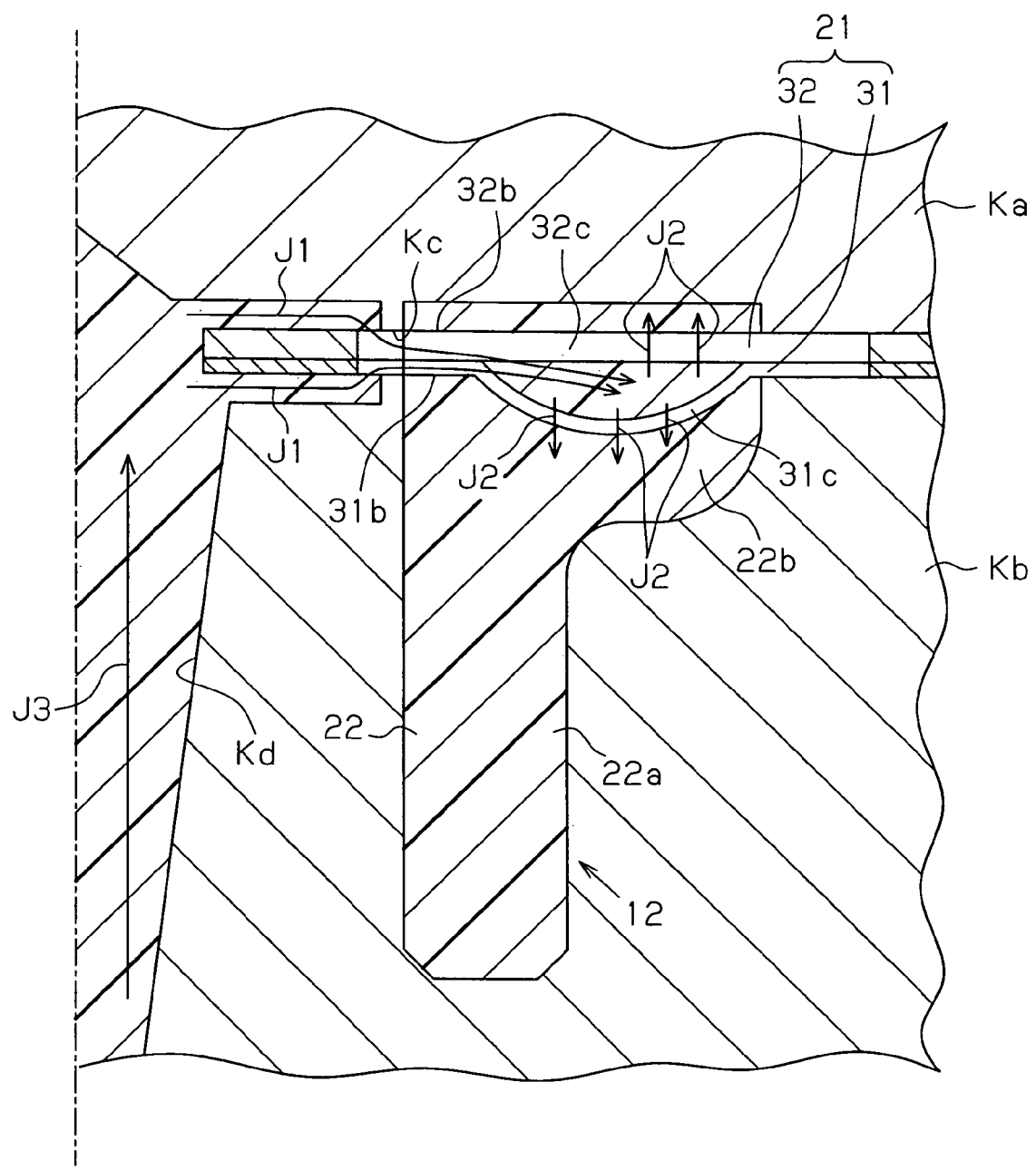
FIG. 7 is a schematic diagram illustrating the method for manufacturing the armature.

In the superimposing process, the two conductive plates 55 and 56 that have been punched out are superimposed as shown in FIG. 5. Here, the projections 32d and 32e are inserted through the holes 31d and 31e (refer to FIG. 6(a)) and crimped in this state. As a result, the tips of the projections 32d and 32e are deformed to cover the openings of the holes 31d and 31e and fix the two conductive plates 55 and 56 (including the short-circuit member formation groups 31 and 32) to each other (refer to FIG. 6(b)).

After the crimping, the outer terminals 31a and 32a and the inner terminals 31b and 32b are further spot-welded. In detail, the tin plating between the outer terminals 31a and 32a and between the inner terminals 31b and 32b is melted to bond the terminals together.

In the insulator filling process, the short-circuit insulator 22 is formed in the conductive plates 55 and 56 as shown by double-dashed lines in FIG. 5. In detail, the superimposed conductive plates 55 and 56 are placed in molds Ka and Kb (refer to FIG. 7), and molten resin material is filled into the space between various parts (outer terminals 31a and 32a and inner terminals 31b and 32b) and solidified so as to form the boss 22a and so on. This forms a resin portion including the short-circuit insulator 22.

The resin material used here is a thermosetting resin material. The molten resin material is first injected into spaces between the linking portions 31c and the linking portions 32c along the longitudinal direction of both linking portions 31c and 32c, as shown by arrow J1 in FIG. 7. Then, the resin material flows toward other parts including a part corresponding to the boss 22a through gaps between the linking portions 31c and gaps between the linking portions 32c in the thicknesswise direction of the linking portions 31c and 32c, as shown by arrow J2 in FIG. 7. This forms the resin portion including the short-circuit insulator 22. The molds Ka and Kb include a gate Kc for first injecting the molten resin material into the space between the linking portions 31c and the linking portions 32c. In the present embodiment, as shown by arrow J1 in FIG. 5, the molten resin material is injected from the space between adjacent ones of the inner terminals 31b and 32b. Accordingly, the gate Kc is formed in the molds Ka and Kb in correspondence with the inner terminals 31b and 32b. A runner Kd for sending resin material to the gate Kc as shown by arrow J3 is formed at a position corresponding to the center of the rotation shaft 2.

Next, in the removing process, the inner linking portions 51 and 52 and the outer linking portions 53 and 54 of the conductive plates 55 and 56 are removed. This completes the manufacture of the short-circuit member 12 shown in FIG. 2.

Next, in a commutator manufacturing process, the short-circuit member 12 is attached to an intermediate member, which becomes the commutator main body 11. In detail, in a process separate from the manufacturing processes of the short-circuit member 12, the intermediate member (not shown) is manufactured by molding the main body insulator 14 in a conductive tubular member (not shown), which includes the commutator pieces 13. The conductive tubular member is arranged in a mold (not shown) and molten resin material is filled into the mold and solidified to form the cylindrical portion 14a in the conductive tubular member (main body insulator formation process). The resin material used for the molding is the thermosetting resin (phenol resin etc.) described above. The mold used for the molding has projections (not shown) for forming the recess 13b (refer to FIG. 8(a)). Thus, the recesses 13b are formed in the conductive tubular member with the mold that molds the resin portion (main body insulator 14) when the mold is clamped (recess formation process).

The short-circuit member 12 is fixed to the axial end portion of the intermediate member, which includes the commutator main body 11, so that its outer terminals 31a and 32a are electrically connected to the commutator pieces 13. In detail, in a state in which the outer terminals 31a and 32a are arranged in the recesses 13b, the short-circuit member 12 undergoes crimping. More specifically, in a state in which the outer terminals 31a and 32a are arranged in the recesses 13b, two walls of the recesses 13b are crimped by the jig (punch) 41 so that the crimped walls partially cover the outer terminals 31a and 32a (refer to FIG. 8(b)). The crimped portion of the outer terminals 31a and 32a and the recesses 13b are welded through laser-welding and firmly fixed.

Next, the conductive tubular member is cut in the circumferential direction to form a plurality (twenty-four) of the commutator pieces 13. This completes the manufacture of the commutator 4. In this state, the wire connection portions 13a of the commutator 4 are not yet bent and the coils 5 are yet to be hooked to the wire connection portions 13a.

Next, in a provisional assembly process, the armature core 3 and the commutator 4 are assembled with the rotation shaft 2 by pressing the rotation shaft 2 into the armature core 3 and the commutator 4. In this state, to prevent the distal surface of the boss 22a from coming into contact with the tubular portion 3a of the armature core 3, a gap is formed between the boss 22a and the tubular portion 3a of the armature core 3 in the axial direction.

Next, in a coiling process, in a state in which the coils 5 are hooked on the wire connection portions 13a, the coils 5 are wound around predetermined teeth 3b of the armature core 3 by concentrated winding or distributed winding. In this state, the portion of each coil 5 extending from the corresponding wire connection portion 13a to the corresponding predetermined tooth 3b, that is, the crossover wire 5a, is entwined to and supported by the boss 22a. More specifically, the crossover wire 5a is guided free from direct contact with the rotation shaft 2 so that it is not abruptly bent at a sharp curvature in accordance with the diameter of the rotation shaft 2.

In a main assembly process, at least one of the armature core 3 and the commutator 4 is pressed and moved along the rotation shaft 2 in a manner that the distal surface of the boss 22a is pressed against the tubular portion 3a of the armature core 3 as shown in FIG. 1. This completes the manufacture of the armature 1.

The armature 1 with the above-described structure enables electric current to flow not only through the commutator pieces 13 that are in direct contact with the anode and cathode power feeding brushes but also through the commutator pieces 13 that are in contact with the brushes through the short-circuit conductor 21 of the short-circuit member 12. This structure reduces the number of the anode and cathode power feeding brushes required, and enables electric current to be simultaneously supplied to a larger number of coils 5.

The present embodiment has the advantages described below.

(1) By employing the above manufacturing method, the short-circuit conductor 21 in the short-circuit member 12 is embedded in the short-circuit insulator 22 excluding the outer terminals 31a and 32a. This prevents rubbing in the short-circuit conductor 21 (linking portions 31c and 32c) and prevents the short-circuit conductor 21 and the coils 5 from rubbing against each other. Thus, layer short-circuiting is prevented.

Further, in the insulator filling process, molten resin material is first injected into the space between the linking portions 31c and the linking portions 32c so that the injected resin material leaks out of the gaps between the linking portions 31c and 32c and molds the short-circuit insulator 22. This causes the pressure produced when filing the resin material to separate the linking portions 31c and 32c of the different short-circuit member formation groups 31 and 32 from each other in the superimposing direction. Thus, the linking portions 31c and 32c are prevented from deforming toward each other and coming into contact, and the insulation state of the linking portions 31c and 32c is kept in a satisfactory state. As a result, the short-circuit member 12, and consequently, the commutator 4, easily prevent layer short-circuiting.

(2) In the insulator filling process, molten resin is injected from the space between adjacent ones of the inner terminals 31b and 32b. This enables the molten resin material to be evenly and easily injected radially with the runner Kd, which is formed along the axis of the molds Ka and Kb to extend toward the gate Kc (refer to FIGS. 5 and 7). If the molten resin material were to be injected from the space between the adjacent ones of the outer terminals 31a and 32a from the radially outer side of the outer terminals 31a and 32a, a runner having a complicated structure would be necessary to evenly inject the molten resin and molding would thus become difficult. The present embodiment avoids such a problem.

(3) In the punching process performed prior to the insulator filling step, the conductive plates 55 and 56 are punched so that the linking portions 31c and 32c in the short-circuit member formation groups 31 and 32 are formed separated from one another in the circumferential direction. During the punching process, with the different short-circuit member formation groups 31 and 32 in a superimposed state, the conductive plates 55 and 56 are punched in directions facing away from each other. Thus, even when burrs are produced during the punching process, the burrs extend in directions facing away from each other in the superimposed state. This prevents such burrs of the linking portions 31c and 32c in the short-circuit member formation groups 31 and 32 from erroneously contacting one another and thus maintains a satisfactory insulation state.

(4) In the punching process performed prior to the insulator filling step, the conductive plates 55 and 56 are punched so that the linking portions 31c and 32c, the outer terminals 31a and 32a, and the inner terminals 31b and 32b in the short-circuit member formation groups 31 and 32 are formed separated from one another in the circumferential direction. Simultaneously, the conductive plates 55 and 56 are punched to form the outer linking portions 53 and 54, which annularly connect the radially outer side of the outer terminals 31a and 32a, and the inner linking portions 51 and 52, which annularly connect the radially inner side of the inner terminals 31b and 32b. In the removing process performed subsequent to the insulator filling process, the outer linking portions 53 and 54 and the inner linking portions 51 and 52 are removed. This supports and maintains the intervals of the linking portions 31c and 32c in the circumferential direction of the outer linking portions 53 and 54 and the inner linking portions 51 and 52 in the insulator filling process. Thus, other separate devices are not necessary to maintain the intervals of the linking portions 31c and 32c and thus a satisfactory insulation state is maintained.

(5) In the commutator manufacturing process, the short-circuit member 12 is fixed to the intermediate member in which the main body insulator 14 is molded to the generally cylindrical conductive tubular member including the commutator pieces 13. As a result, the main body insulator 14 and the short-circuit insulator 22 are formed separately unlike when the main body insulator 14 of the commutator main body 11 and the short-circuit insulator 22 of the short-circuit member 12 are simultaneously molded from the same material. Therefore, in the present embodiment, for example, even if the commutator 4 is of the type including the short-circuit member 12 or even if a commutator of a different type that does not include the short-circuit member 12 is used, the commutator main body 11 of the present embodiment may be commonly used. This enables standardizing of the commutator main body 11 and allows for reduction in costs.

In the present embodiment, the main body insulator 14 of the commutator main body 11 and the short-circuit insulator 22 of the short-circuit member 12 are formed from different materials. Thus, for example, by forming the main body insulator 14 with a material having superior heat expansion and contraction characteristics and a high mechanical strength (in the present embodiment, thermosetting resin, namely, a phenol resin), displacement of the commutator pieces 13 in the radial direction is reduced. Further, the short-circuit member 12 including the short-circuit insulator 22 is arranged on the axial end portion of the commutator main body 11. Thus, even though the short-circuit insulator 22 is formed from a material having relatively poor heat expansion and contraction characteristics and a relatively low mechanical strength (a thermoplastic resin in the present embodiment), the short-circuit insulator 22 does not affect displacement of the commutator pieces 13 in the radial direction. Thus, the short-circuit insulator 22 may be formed from a material having relatively poor heat expansion and contraction characteristics and a relatively low mechanical strength (a thermoplastic resin in the present embodiment) to manufacture the short-circuit member 12 with low costs and facilitate recycling.

(6) In the recess formation process performed prior to the commutator manufacturing process, the recesses 13b are formed in the axial end portion of the conductive tubular member, which is the intermediate member (commutator pieces 13). In the commutator manufacturing process, crimping is performed with the punch 41, which is wider than the recesses 13b, in a state in which the outer terminals 31a and 32a are arranged in the recesses 13b. This crimps the two walls of each recess 13b and covers the outer terminals 31a and 32a with the two crimped walls. Thus, the short-circuit member 12 is rigidly fixed, and the resistance of the commutator pieces 13 and the short-circuit conductor 21 is lowered.

(7) The recesses 13b are formed by the mold used in the main body insulator formation process, which is for molding the resin portion including the main body insulator 14 by accommodating the conductive tubular member with the commutator pieces 13 in the mold. This simultaneously performs the main body insulator formation process and the recess formation process. Thus, the number of processes and the amount of molding jigs may be reduced in comparison to when the recess formation process is separately performed.

The manufacturing method and the short-circuit member and commutator manufactured by that method may be modified in the following forms.

In the above embodiment, the commutator 4 includes the twenty-four commutator pieces 13 short-circuited at 120-degree intervals. However, the number of the commutator pieces 13 included in the commutator 4 may be different, and the short-circuiting angular interval of the short-circuited commutator pieces 13 may be different. For example, a commutator may include sixteen segments short-circuited in 180-degree intervals. In this case, the structure of the short-circuit member 12 is modified accordingly.

In the above embodiment, the linking portions 31c in the lower short-circuit member formation group 31 are curved axially downward with respect to the outer terminals 31a and the inner terminals 31b. Thus, the linking portions 31c and 32c are in non-contact with one another in the superimposing direction. However, this may be changed to other structures as long as linking portions are prevented from coming into contact with each other.

Figure 9:
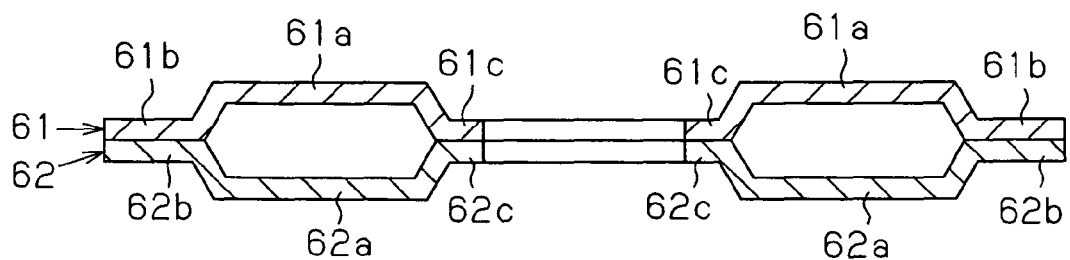
FIG. 9 is a schematic diagram showing a further example of a short-circuit member.

For example, as shown in FIG. 9, linking portions 61a and 62a in two short-circuit member formation groups 61 and 62 may be bent with respect to outer terminals 61b and 62b and inner terminals 61c and 62c in a direction in which the linking portions 61a and 62a are spaced from each other so that the linking portions 61a and 62a do not come in contact with each other in the superimposing direction. In such a modification, the space in the superimposing direction between the linking portions 61a and the linking portions 62a may easily be widened. Thus, molten resin material is easily first injected into the space in the superimposing direction between the linking portions 61a and the linking portions 62a. That is, the insulator filling process is easily performed.

Figure 10:
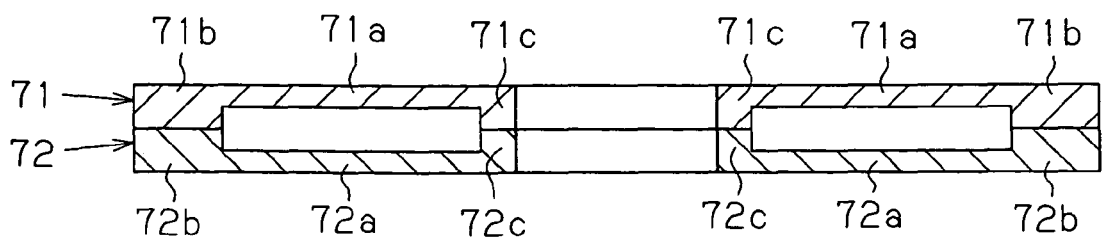
FIG. 10 is a schematic diagram showing a another example of a short-circuit member.

Further, as shown in FIG. 10, linking portions 71a and 72a in two short-circuit member formation groups 71 and 72 may be formed to be thinner than outer terminals 71b and 72b and inner terminals 71c and 72c. In this case, the linking portions 71a and 72a do not come in contact with each other in the superimposing direction.

In the above embodiment, the linking portions 31c and 32c in the short-circuit member formation groups 31 and 32 respectively link the outer terminals 31a and 32a and the inner terminals 31b and 32b that are arranged at positions separated from one another by the predetermined angle in the circumferential direction. However, it is only required that the linking portions in at least one of the short-circuit member formation groups link the outer terminals and the inner terminals that are arranged at positions separated from each other by the predetermined angle in the circumferential direction.

In the above embodiment, each of the linking portions 31c and 32c extends along an involute curve. However, the linking portions 31c and 32c may be formed along other curves or simply along a straight line.

In the above embodiment, one of the short-circuit member formation groups 31 is formed to be thinner than the other one of the short-circuit member formation groups 32. However, the present invention is not limited in such a manner, and, for example, two short-circuit member formation groups may have the same thickness.

In the above embodiment, one of the short-circuit member formation groups 31 is formed from a material having a smaller electric resistivity than the material used for the other one of the short-circuit member formation groups 32. However, the present invention is not limited to this structure. For example, the two short-circuit member formation groups may be formed from the same material or have the same thickness.

In the above embodiment, the main body insulator 14 of the commutator main body 11 and the short-circuit insulator 22 of the short-circuit member 12 are formed from different materials. However, the present invention should not be limited to this structure. For example, the main body insulator and the short-circuit insulator may both be formed from a thermosetting resin (a phenol resin etc.).

In the insulator filling process, molten resin material is injected into the space between the inner terminals 31b and 32b arranged in the circumferential direction. However, when first injecting the molten resin material from beside the space between one the linking portions 31c and the linking portions 32c, the molten resin material may also be injected from other positions, such as from between the outer terminals 31a and 32a.

In the punching process, the conductive plates 55 and 56 are punched in directions in which the short-circuit member formation groups 31 and 32 face away from each other in a superimposed state. However, the present invention is not limited in such a manner, and the conductive plates 55 and 56 may be punched in other directions.

In the punching process, the conductive plates 55 and 56 are punched to form the outer linking portions 53 and 54 and the inner linking portions 51 and 52. However, the present invention is not limited in such a manner, and the conductive plates 55 and 56 may be punched so that only either the outer linking portions 53 and 54 or the inner linking portions 51 and 52 are formed. Further, the conductive plates 55 and 56 may be punched so that neither the outer linking portions 53 and 54 nor the inner linking portions 51 and 52 are formed. In such a case, the insulator filling process must be performed while maintaining the interval between the linking portions 31c and 32c through methods differing from the above embodiment.

In the commutator manufacturing process, the short-circuit member 12 is fixed by performing crimping with the punch 41 in a state in which the outer terminals 31a and 32a are arranged in the recesses. However, the present invention is not limited in such a manner, and the short-circuit member 12 may be fixed through other methods, such as welding.

The short-circuit member formation groups 31 and 32 are fixed to each other through crimping and welding. However, the present invention is not limited in such a manner, and the fixing may be achieved through other methods such as only welding. Further, the welding of the above embodiment does not have to be performed. Alternatively, the welding other than spot-welding may be performed. In the above embodiment, the tin plating applied in advance is melted and bonded. However, base materials may be melted for the bonding.

The invention claimed is:

1. A method for manufacturing a short-circuit member including a short-circuit conductor, which short-circuits a plurality of commutator pieces arranged around a rotation axis of a motor, and a short-circuit insulator for the short-circuit conductor, wherein the short-circuit conductor includes first and second short-circuit member formation groups arranged in a superimposed state, with each of the short-circuit member formation groups having a plurality of outer terminals arranged about the rotation axis in the vicinity of the commutator pieces, a plurality of inner terminals arranged about the rotation axis inward from the outer terminals in which said plurality of inner terminals includes adjacent ones of the inner terminals wherein inner terminals oppose one another in a circumferential direction around the rotation axis without any other inner terminal being disposed therebetween, and a plurality of linking portions linking the outer terminals to the inner terminals in which said plurality of linking portions includes adjacent ones of the linking portions wherein linking portions oppose one another without any other linking portion being disposed therebetween, the outer terminals contacting one another and the inner terminals contacting one another between each of the short-circuit member formation groups, the linking portions being maintained in non- contact between each of the short-circuit member formation groups, the linking portions in at least one of the first and second short-circuit member formation groups linking the outer terminals and the inner terminals that are separated from each other by a predetermined angle in the circumferential direction, and the short-circuit conductor being embedded in the short-circuit insulator, the method comprising:

a punching step for punching out the first and second short-circuit member formation groups from conductive plates, each short-circuit member formation group having an inner linking portion and an outer linking portion for annularly linking the linking portions respectively at an inner side and an outer side in a radial direction of the conductive plates;

a superimposing step for superimposing and fixing the first and second short-circuit member formation groups to each other;

an insulator filling step for molding the short-circuit insulator by filling molten resin material between opposing ones of the linking portions in the first and second short-circuit member formation groups, in a mold, along a longitudinal direction of the linking portion, from between inner terminals of said adjacent ones of the inner terminals so that filled resin material leaks out of gaps between linking portions of said adjacent ones of the linking portions in a thicknesswise direction of the linking portions to form a boss for supporting a coil of the motor; and a removing step for removing the inner linking portions and the outer linking portions of the short-circuit formation groups to complete the manufacture of the short-circuit member, wherein inner terminals oppose one another in a circumferential direction around the rotation axis without any other inner terminal being disposed therebetween, and wherein linking portions oppose one another without any other linking portion being disposed therebetween.

2. A method for manufacturing a commutator, comprising:
a fixing step for fixing the short-circuit member manufactured through the method for manufacturing a short-circuit member according to claim 1 to a commutator main body including a main body insulator for holding the commutator pieces or to an intermediate member obtained in the process of manufacturing the commutator main body.

3. The method for manufacturing a commutator according to claim 2, further comprising the steps of:
forming recesses in an axial end portion of the commutator main body or the intermediate member prior to the fixing step of the short-circuit member; and fixing the short-circuit member to the commutator main body or the intermediate member by arranging the outer terminals in the recesses and crimping the outer terminals in the recesses with a punch.

4. The method for manufacturing a commutator according to claim 3, further comprising the step of:
subsequent to arranging the outer terminals in the recesses and crimping the outer terminals in the recesses with a punch, welding the crimped portion.

\* \* \* \* \*